(12) United States Patent
Goodwill et al.

(10) Patent No.: US 11,269,200 B2
(45) Date of Patent: Mar. 8, 2022

(54) DRIVING OF PHOTONIC ELEMENTS BY COMMON ELECTRICAL DRIVER

(71) Applicant: Huawei Technologies Canada Co., Ltd., Kanata (CA)

(72) Inventors: Dominic John Goodwill, Ottawa (CA); Lukas Chrostowski, Vancouver (CA); Hamid Mehrvar, Ottawa (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 17/153,355

(22) Filed: Jan. 20, 2021

(65) Prior Publication Data

US 2021/0141248 A1 May 13, 2021

Related U.S. Application Data

(62) Division of application No. 15/080,065, filed on Mar. 24, 2016, now Pat. No. 10,914,968.

(51) Int. Cl.
*G02F 1/01* (2006.01)
*G02F 1/025* (2006.01)
*G02F 1/015* (2006.01)

(52) U.S. Cl.
CPC .......... *G02F 1/0121* (2013.01); *G02F 1/0147* (2013.01); *G02F 1/025* (2013.01); *G02F 1/0157* (2021.01)

(58) Field of Classification Search
CPC ...... G02F 1/0121; G02F 1/0147; G02F 1/025; G02F 1/0157
See application file for complete search history.

(56) References Cited

U.S. PATENT DOCUMENTS

| | | | | |
|---|---|---|---|---|
| 6,721,081 B1* | 4/2004 | Mauro | ................ | G02F 1/0123 359/239 |
| 6,763,197 B1* | 7/2004 | Hirano | ................ | H04J 14/08 398/191 |
| 8,705,900 B2* | 4/2014 | Goh | ................ | G02F 1/0121 385/3 |
| 8,953,950 B2* | 2/2015 | Nazarathy | ................ | H03M 1/46 398/203 |
| 9,570,879 B2* | 2/2017 | Hara | ................ | H01S 3/0057 |
| 2004/0061922 A1* | 4/2004 | Mauro | ................ | H04B 10/25137 359/279 |
| 2012/0213531 A1* | 8/2012 | Nazarathy | ................ | H03M 3/434 398/202 |
| 2013/0011093 A1* | 1/2013 | Goh | ................ | H04B 10/5051 385/3 |
| 2015/0029575 A1* | 1/2015 | Hara | ................ | G01N 21/3581 359/279 |

OTHER PUBLICATIONS

Wang et al., Silicon high-speed binary phase-shift keying modulator with a single-drive push-pull high-speed traveling wave electrode, Photon. Res. / vol. 3, No. 3 / Jun. 2015, Posted Feb. 13, 2015. (Year: 2015).*

(Continued)

*Primary Examiner* — Peter Radkowski

(57) ABSTRACT

A hybrid electronic optical chip has a first photonic element with which a first diode is associated, a second photonic element with which a second diode is associated and a common electrical driver connected to the first and second diodes by a common electrical connection with opposite polarity. The electrical driver generates a common electrical drive signal divided in time into first and second drive signal components for independently driving the first and second photonic elements through the common electrical connection.

20 Claims, 8 Drawing Sheets

(56) References Cited

OTHER PUBLICATIONS

Le Nguyen Binh, "Variable pulse width alternating phase duobinary modulation optical transmission," Proc. SPIE 6353, Optical Transmission, Switching, and Subsystems IV, 635326 (Oct. 3, 2006); doi: 10.1117/12.685316 (Year: 2006).*

Le Nguyen Binh, Optical transmission of variable-pulse-width alternating-phase duobinary modulation: MATLAB Simulink simulation and comparison with carrier-suppressed return-to-zero amplitude-shift-keying experimental transmission, Optical Engineering 47_7_, 075001 _Jul. 2008 (Year: 2008).*

Zecevic et al., Integrated Pulsewidth Modulation Control for a Scalable Optical Switch Matrix, IEEE Photonics Journal, vol. 7, No. 6, Dec. 2015 (Year: 2915).*

Akiyama et al., High-speedandefficientsiliconmodulatorbasedonforward-biasedpindiodes, frontiers in Physics, Nov. 2014, vol. 2, Article 65 (Year: 2014).*

Dong et al., Submilliwatt, ultrafast and broadband electro-optic silicon switches, Nov. 2010 / vol. 18, No. 24 / Optics Express 25225 (Year: 2010).*

David Patel, Design, Analysis, and Performance of a Silicon Photonic Traveling Wave Mach-Zehnder Modulator, Thesis, Department of Electrical & Computer Engineering, McGill University, 2014 (Year: 2014).*

Shoji et al., Low-crosstalk 2 x 2 thermo-optic switch with silicon wire waveguides, Apr. 26, 2010 / vol. 18, No. 9 / Optics Express 9071 (Year: 2010).*

\* cited by examiner

7000

Providing a first photonic element with which a first diode is associated
7010

Providing a second photonic element with which a second diode is associated
7020

Providing a common electrical connection to the first and second diodes with opposite polarity
7030

Generating a common electrical drive signal divided in time into first and second drive signal components for independently driving the first and second photonic elements
7040

*FIG. 7*

DRIVING OF PHOTONIC ELEMENTS BY COMMON ELECTRICAL DRIVER

CROSS REFERENCE TO RELATED APPLICATIONS

This application is a divisional of U.S. patent application Ser. No. 15/080,065, filed Mar. 24, 2016, entitled "Photonic Elements Driven by Common Electrical Driver", the contents of which are incorporated herein by reference, inclusive of all filed appendices.

TECHNICAL FIELD

The present disclosure relates generally to photonic elements and, more particularly, to driving photonic elements from a hybrid optical chip.

BACKGROUND

A complex photonic integrated circuit (PIC) typically has a multitude of photonic cells. In a conventional PIC, each photonic cell is driven by a respective electrical driver. Due to the difficulty of making transistors and photonic elements on the same wafer, the electrical drivers and their respective photonic elements are typically provided on separate chips interconnected by one or more electrical pads. The resulting circuit is typically referred to as a hybrid optical electronic chip. It is desirable to minimize the number of electrical drive pads in order to increase the complexity of the chip. Current solutions for increasing the density of hybrid optical electronic chips rely on improving tolerances of the manufacturing equipment and/or using better chemical materials. Both of these avenues lead to increased costs.

There is accordingly a need for an improved hybrid optical electronic chip architecture.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses, in general terms, a technique for electrically driving photonic elements using a common electrical driver and a common electrical connection.

One aspect of the disclosure is a hybrid optical electronic chip that includes a first photonic element with which a first diode is associated, a second photonic element with which a second diode is associated and a common electrical driver connected by a common electrical connection to the first and second diodes with opposite polarity. The electrical driver generates a common electrical drive signal divided in time into first and second drive signal components for independently driving the first and second photonic elements through the common electrical connection.

Another aspect of the disclosure is a method of electrically driving photonic elements. The method entails providing a first photonic element with which a first diode is associated, providing a second photonic element with which a second diode is associated, and providing a common electrical connection to the first and second diodes such that the common electrical connection is connected to the first and second diodes with opposite polarity. The method also entails generating, using a common electrical driver, a common electrical drive signal divided in time into first and second drive signal components for independently driving the first and second photonic elements through the common electrical connection.

Another aspect of the disclosure is a hybrid optical electronic chip that includes an optics chip portion having a first photonic element and a second photonic element, wherein the first photonic element includes a first waveguide and wherein the second photonic element includes a second waveguide. The chip also includes an electronics chip portion that has a first diode associated with the first photonic element and a second diode associated with the second photonic element, wherein the first and second diodes have opposite polarity. The electronic chip portion also includes a signal generator connected to the first and second diodes via a common electrical connection, the signal generator generating a common electrical signal having positive drive level pulses for effecting a first phase shift in the first waveguide and negative drive level pulses for effecting a second phase shift in the second waveguide.

BRIEF DESCRIPTION OF THE DRAWINGS

These and other features of the disclosure will become more apparent from the description in which reference is made to the following appended drawings.

FIG. 7 presents a flowchart of a method of driving photonic elements using a common electrical driver.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the designs and implementations illustrated and described herein, but may be modified within the scope of the appended claims along with their full scope of equivalents.

Figure 1:
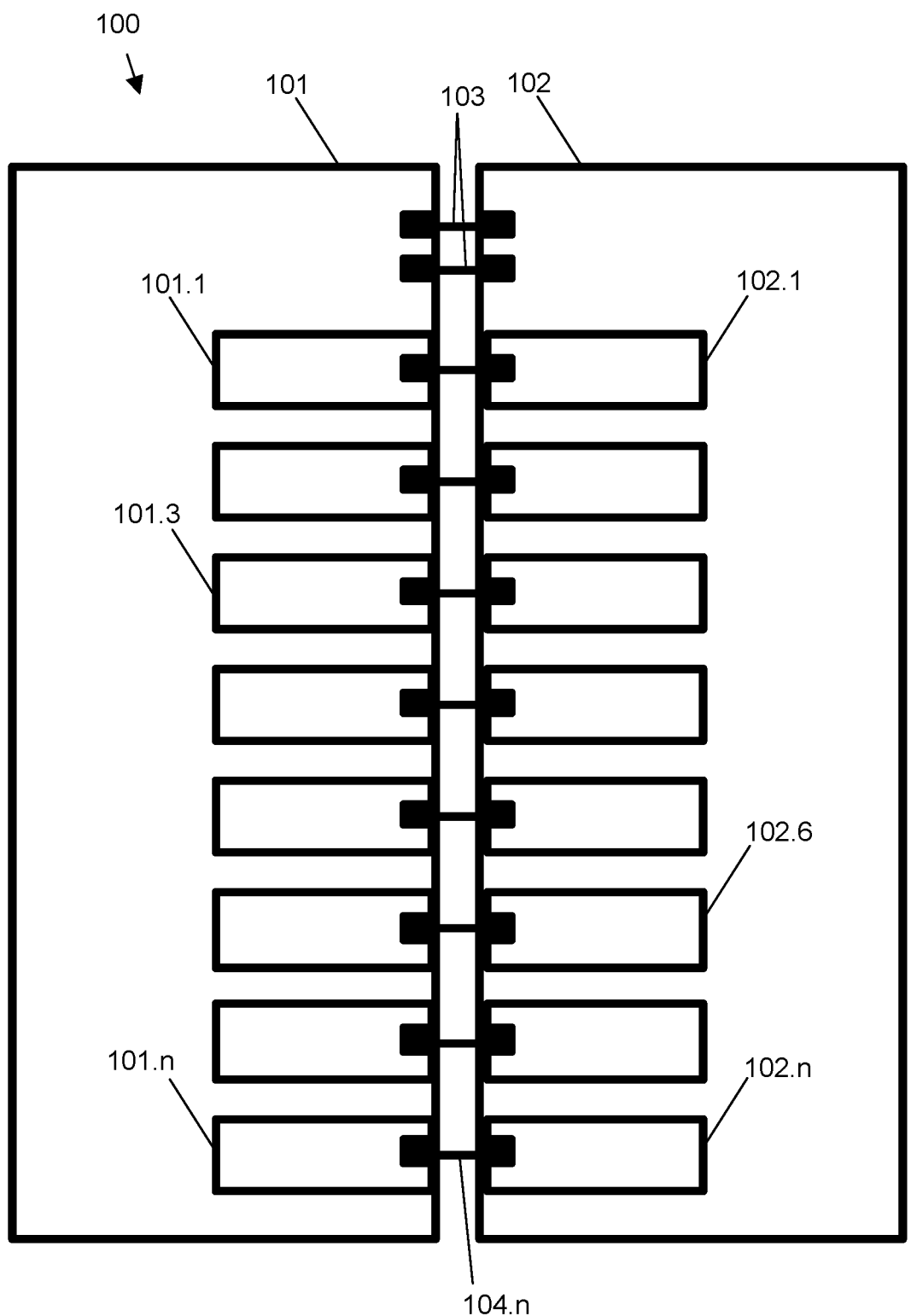
FIG. 1 depicts a hybrid electronic optical chip in accordance with the prior art in which there is one electrical driver per photonic cell.

FIG. 1 presents a conventional electrically driven photonic chip in which each photonic cell is driven by its own electrical driver. In FIG. 1, the electrical drivers are disposed on an electrical chip 101 that is separate and distinct from the photonic chip 102. The electrical chip 101 and the photonic chip 102 are interconnected by common electrical rails 103 for supplying power, providing a ground and/or providing a reference voltage. Together, the interconnected chips form a hybrid optical electronic chip 100. The photonic chip 102 includes a plurality of photonic cells 102.1 ... 102.n. For each of the plurality of photonic cells 102.1 ... 102.n, a respective electrical driver 101.1 ... 101.n is provided. That is, if a networking equipment requires n photonic cells, n electrical drivers are provided in this conventional design.

Figure 2:
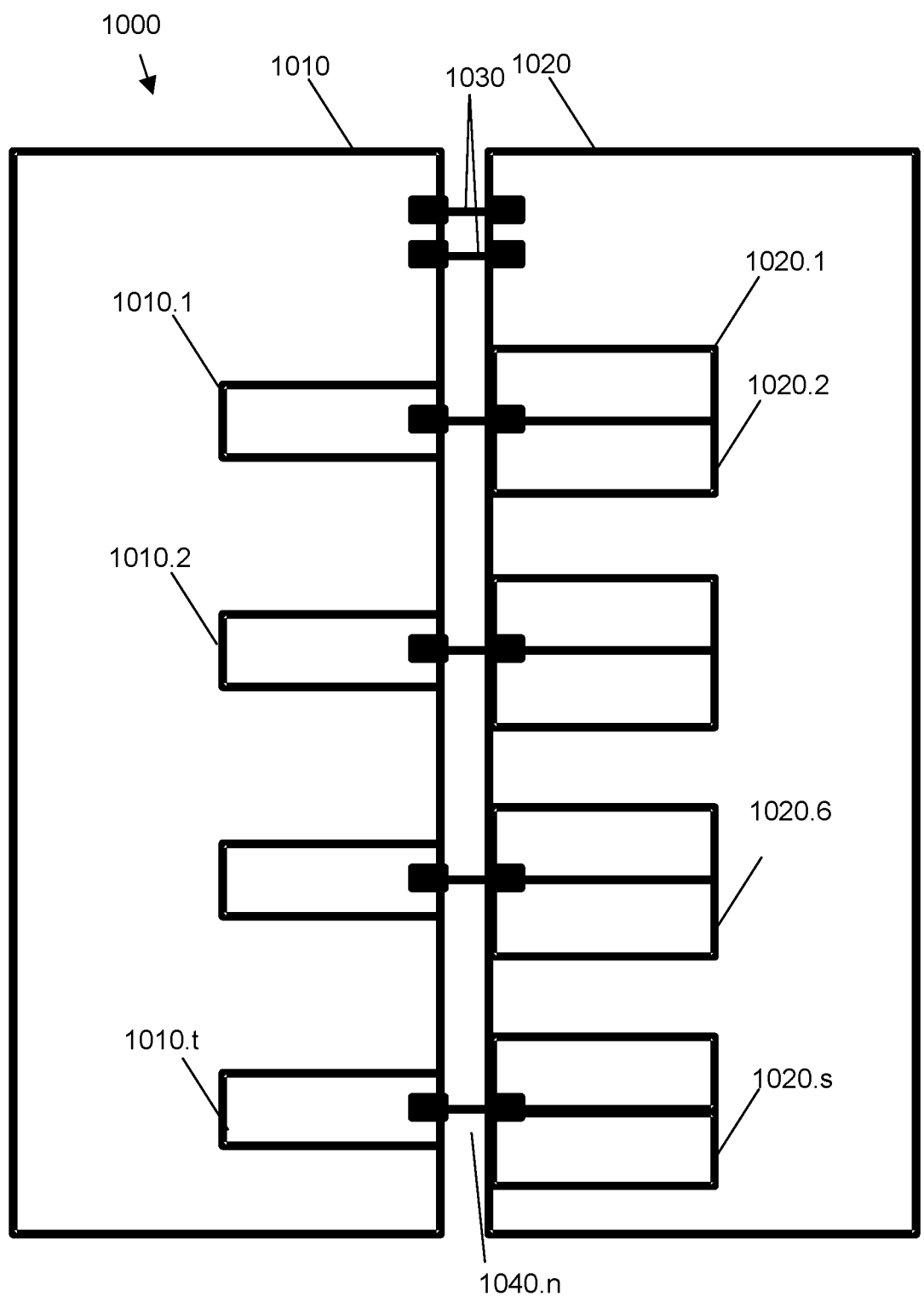
FIG. 2 depicts a hybrid electronic optical chip in accordance with an embodiment of the present invention in which pairs of photonic cells are driven by a common electrical driver.

In contrast, in the embodiment depicted in FIG. 2, a hybrid optical electronic chip 1000 has one electrical driver for a pair of photonic cells. This hybrid optical electronic chip 1000 may be used in various optical networking equipment such as switches, transmitters, receivers, filters, etc. The chip 1000 comprises an electronics portion 1010 and an optics portion 1020. In the illustrated embodiment, the electronics portion 1010 is on an electrical chip whereas the optics portion 1020 is on a separate photonic chip. The electronics portion 1010 and the optics portion 1020 are electrically interconnected through common electrical rails 1030. The electronics portion 1010 includes a plurality of electrical drivers 1010.1 ... 1010.t. The optics portion 1020 includes a plurality of photonic cells 1020.1 ... 1020.s. One electrical driver 1010.1 ... 1010.t drives a pair of photonic cells 1020.1 ... 1020.s. That is, if the networking equipment requires s photonic cells, t=s/2 electrical drivers are provided. In another embodiment, each photonic cell 1020.1 ... 1020.s includes multiple controllable optical elements, each requiring a drive signal. For example, an electrical driver may drive two optical elements within a single photonic cell.

In general, and as will be described in greater detail below, a hybrid optical electronic chip includes a first photonic element with which a first diode is associated (i.e. disposed in proximity to exert a thermo-optic effect on the first photonic element) and a second photonic element with which a second diode is associated. The hybrid optical electronic chip includes a common electrical driver for driving the first and second photonic elements. For the purposes of this specification, the expression "hybrid optical electronic chip" encompasses a monolithic chip having an optics portion (that include the first and second photonic elements as well as the first and second diodes) and an electronics portion (that includes the common electrical driver). The expression "hybrid optical electronic chip" shall also encompass a dual-chip (or multi-chip assembly) that includes an optics chip (having the first and second photonic elements and the first and second diodes) connected to an electronics chip (having the common electrical driver).

In both implementations of the hybrid optical electronic chip, the common electrical driver is connected by a common electrical connection to the first and second diodes with opposite polarity. A diode passes current when the applied voltage at its positive terminal is positive compared to the applied voltage at its negative terminal (positive polarity), and blocks current when the applied voltage is of the opposite polarity (negative polarity). The positive terminal may be p doped semiconductor and the negative terminal may be n doped semiconductor. Other diodes may be used, including MOSFET and Schottky diodes. In some diodes, the positive polarity voltage must exceed a threshold voltage in order to pass current, and the negative polarity voltage must not exceed a reverse breakdown voltage. The electrical driver generates a common electrical drive signal divided in time into first and second drive signal components for independently driving the first and second photonic elements through the common electrical connection. In the illustrated embodiments, the first and second components are pulse width modulated (PWM) signals of opposite polarity, e.g. the first and second components are positive and negative drive-level pulses in respective timeslots.

In some embodiments, as will be described below, the photonic elements are thermo-optic phase shifters in which the first and second diodes generate heat to effect a phase shift in optical waveguides of the first and second photonic elements, by means of a thermo-optic change in refractive index, in response to a drive current supplied by the common electrical driver. These phase shifters may be used for adjusting the optical bias in switches, transmitters, receivers, and filters.

In the embodiment depicted in FIG. 2, a single common (or shared) electrical driver selectively supplies a drive current (or drive signal) to one of the pair of photonic elements by allocating alternate periods of time (i.e. alternating timeslots) to the two photonic elements such that first signals sent during a first set of timeslots are received by the first photonic element whereas second signals sent during a second set of timeslots are received by the second photonic element. To achieve this, the first and second photonic elements are controlled by first and second diodes, respectively, wherein the positive terminal of the first diode and the negative terminal of the second diode are connected to the common electrical driver. Accordingly, the electrical driver generates a common electrical drive signal divided in time into first and second drive signal components for independently driving the first and second photonic elements through the common electrical connection. The first and second drive signal components may be a set of positive drive level pulses and a set of negative drive level pulses. In one embodiment, the positive drive level pulses occupy a first set of timeslots whereas the negative drive level pulses occupy a second set of timeslots. In one embodiment, the first set of timeslots and the second set of timeslots are of equal duration. However, in other embodiments, the first and second set of timeslots have different durations.

Figure 3A:
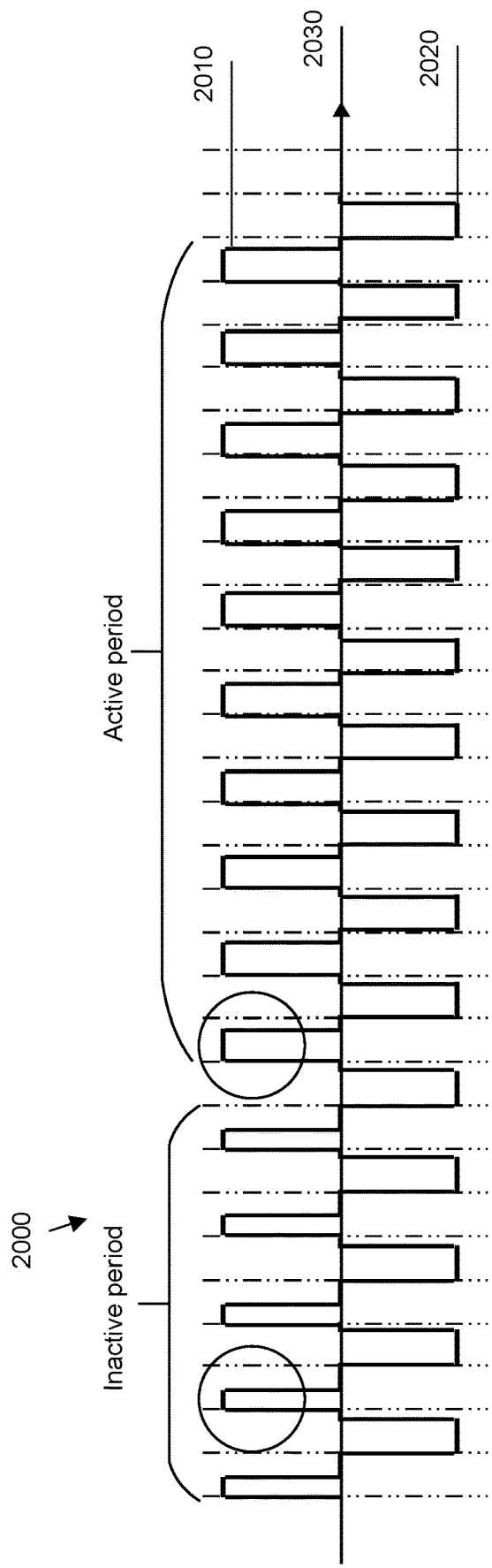
FIG. 3A depicts a bipolar pulse width modulated (PWM) drive signal for driving a pair of photonic cells.
Figure 3B:
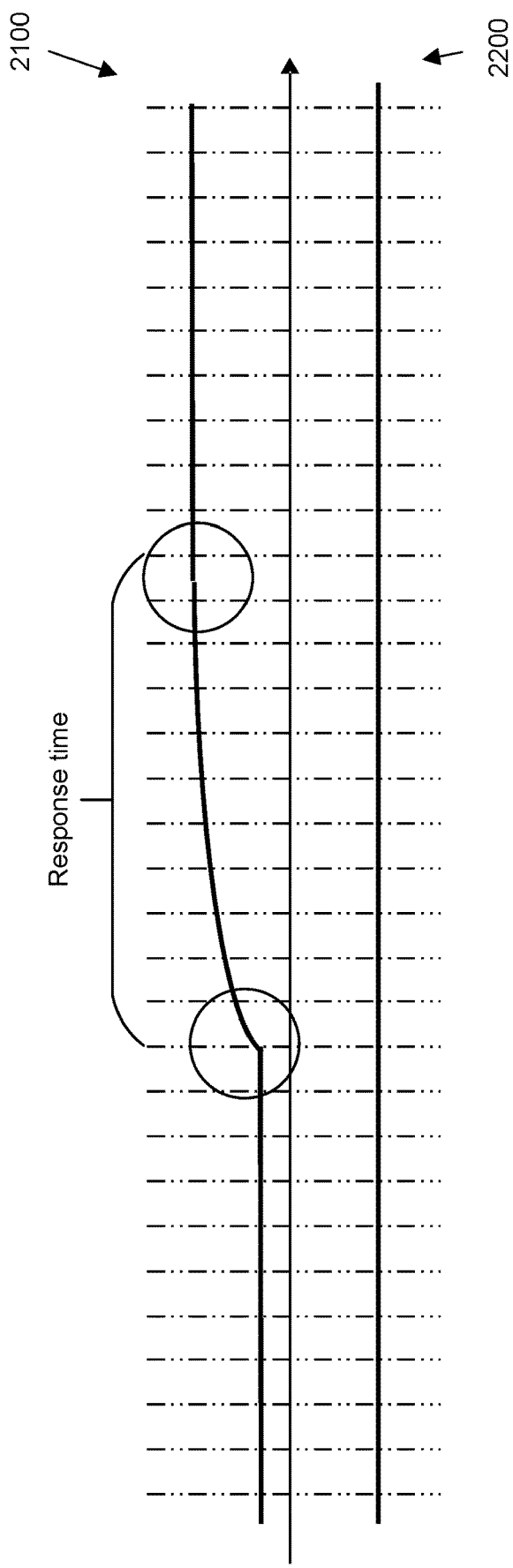
FIG. 3B depicts a response of the photonic elements to the drive signal depicted in FIG. 3A.

FIG. 3A shows a time-coded or time-divided drive signal which, in the illustrated embodiments, is a PWM drive signal 2000 having first (e.g. positive) and second (e.g. negative) components for independently driving a pair of photonic cells. FIG. 3B shows the responses 2100 and 2200 of two photonic elements to the PWM drive signal 2000 depicted in FIG. 3A. The FIGS. illustrate a change in state of the first photonic element from an inactive state to an active state, while the second photonic element is in a constant active state. The PWM drive signal 2000 provides positive drive level pulses 2010 (as the first component of the drive signal) and negative drive level pulses 2020 (as the second component of the drive signal). The drive level pulses (PWM pulses) are positive and negative relative to a reference level 2030. A positive-level period of the positive drive level pulses 2010 controls activation of the corresponding photonic cell independently from the other photonic cell. Likewise, a negative-level period of the negative drive level pulses 2020 controls activation of the corresponding photonic cell independently. In the depicted example of FIGS. 3A and 3B, the positive-level period of the positive drive level pulses 2010 is initially set to a duration that does not activate the corresponding photonic cell, as can be seen by the response level 2100. This is denoted in FIGS. 3A and 3B as an inactive period. The positive-level period of the positive drive level pulses 2010 is then later set to a duration that activates the corresponding photonic cell, as can be seen by the response level 2100 of the first photonic element. This is denoted in FIG. 3A as an active period. In other words, as shown in FIG. 3A, the "inactive period" refers to the inactive period of the first photonic cell, and it includes the five short positive pulses. The "active period" refers to the active period of the first photonic cell, and it begins with the first of the ten large positive pulses. Once the active period is set, the response from the corresponding photonic cell rises until the response level stabilizes, defining a response time of the corresponding photonic cell. In the example depicted in FIGS. 3A and 3B, the negative-level period of the negative drive level pulses 2020 remains consistently sufficient to activate the corresponding photonic cell as can be seen from the constant response 2200 of the second photonic element.

To change the state of the photonic element, a fill factor for the PWM driver is varied. The photonic cell changes state using the natural response time of the photonic cell. A change in fill factor can be accomplished as a stepwise change ("jump change") to a desired new target from one pulse period to the next pulse period. Alternatively, the fill factor can be ramped slowly using a feedback loop that measures the state of the photonic cell using, for example, a photodetector or temperature sensor. Changes to the two cells in a photonic element pair can be simultaneous, overlapping or independent, depending on the desired behavior of the optical circuit in which the photonic cells are integrated.

Figure 4:
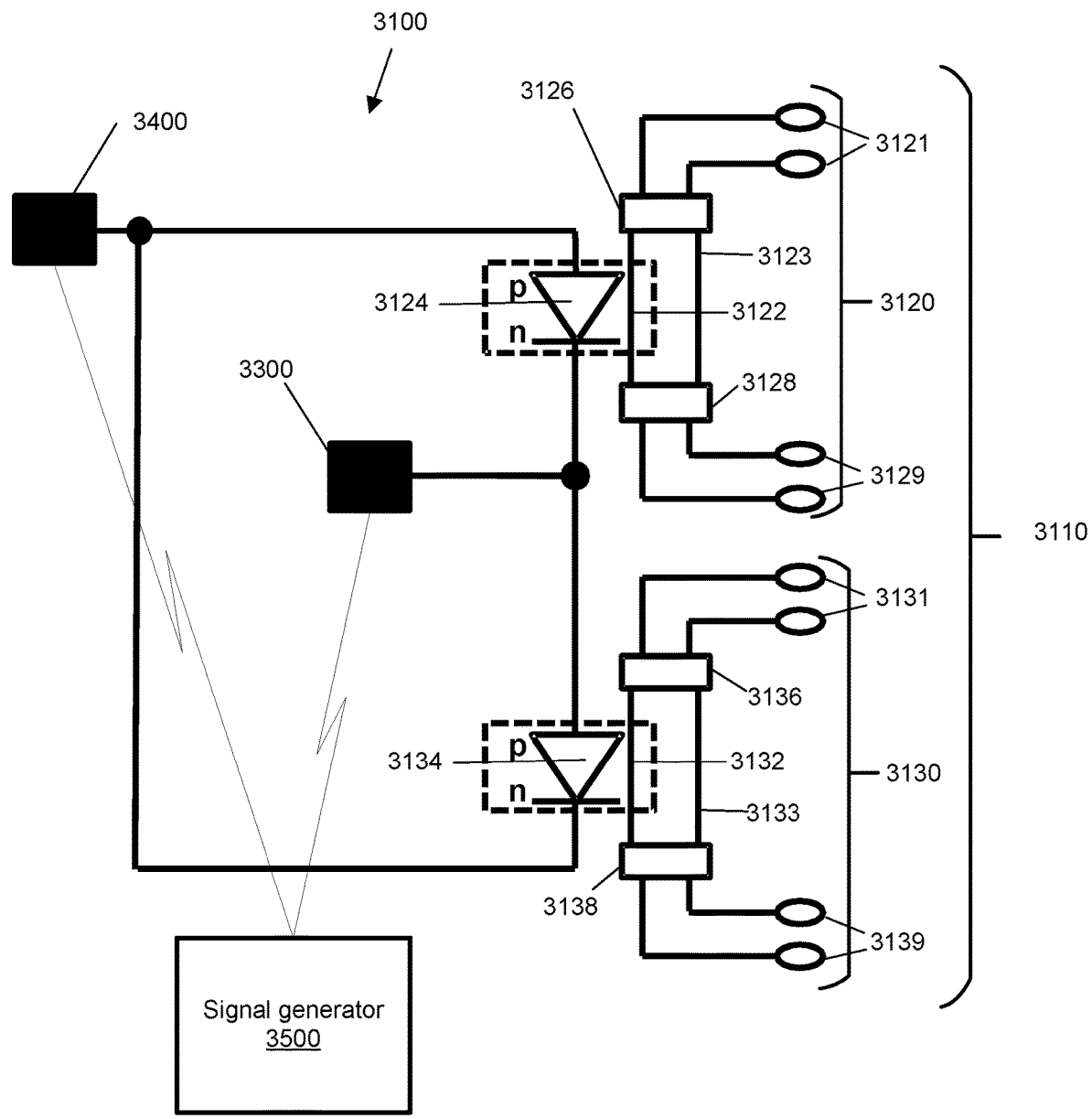
FIG. 4 is a circuit diagram of a pair of photonic elements driven by a common electrical driver.
Figure 5:
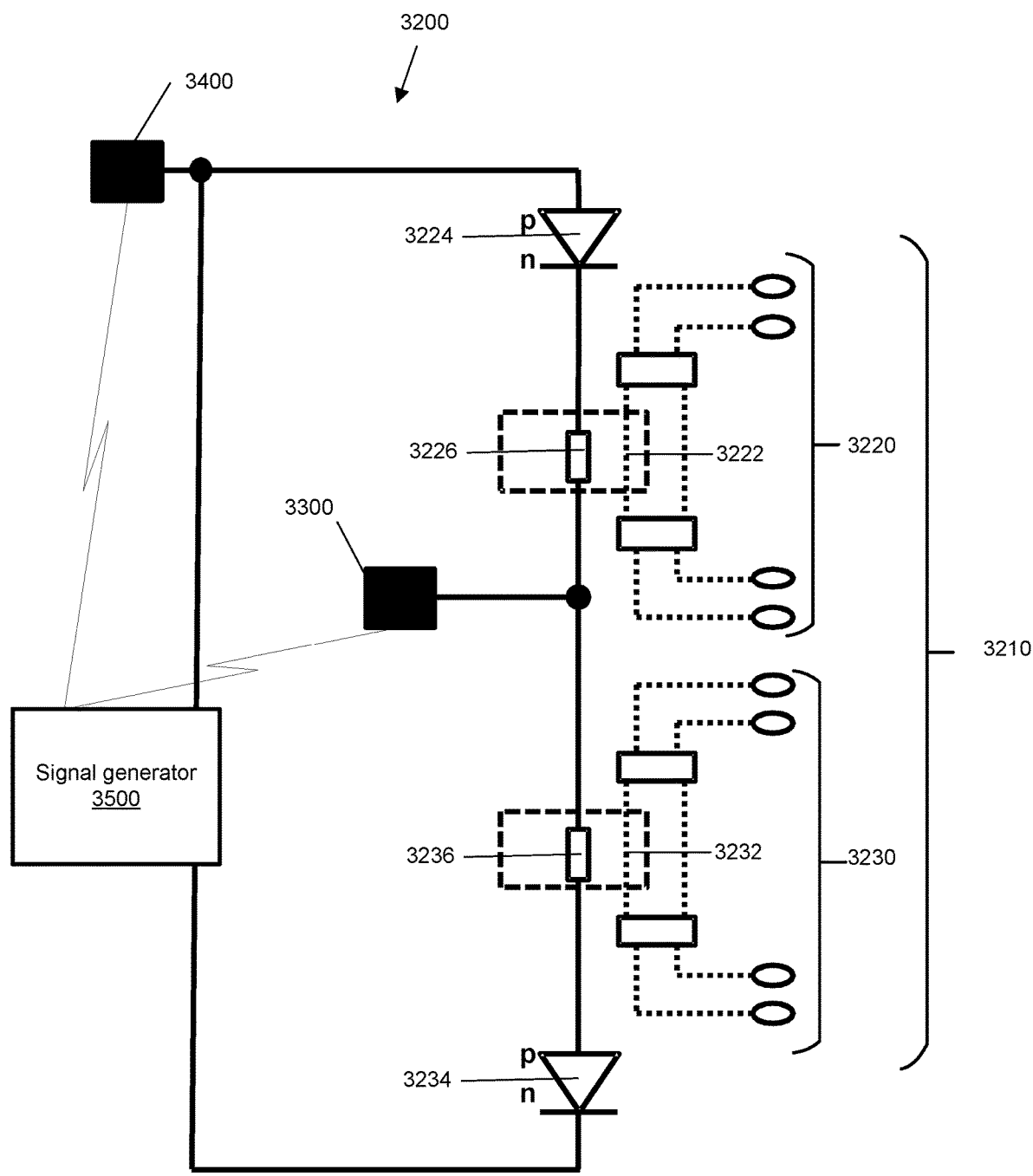
FIG. 5 is another circuit diagram depicting a pair of photonic elements driven by a common electrical driver.

FIGS. 4 and 5 present circuit diagrams 3100 and 3200 of hybrid optical electronic chips, each having a pair of photonic elements 3110 and 3210 driven by positive and negative signal components of a drive signal generated by a common electrical driver. FIG. 5 is similar to the circuit of FIG. 4 except that it further includes resistors for generating heat, as will be described below.

In the embodiment depicted in FIG. 4, an optics chip portion includes a first waveguide 3122 associated with a first photonic element 3120 of the pair of photonic elements 3110. The first waveguide 3122 transports light from an optical input 3121, through an optical splitter 3126 and an optical combiner 3128 to an optical output 3129. The first photonic element 3120 also contains an idle optical waveguide 3123. As depicted in FIG. 4, a second waveguide 3132 is associated with a second photonic element 3130 of the pair of photonic elements 3110. The second waveguide 3122 transports light from an optical input 3131, through an optical splitter 3136 and an optical combiner 3138 to an optical output 3139. The first photonic element 3120 also contains an idle optical waveguide 3123. The photonic elements 3120, 3130 may be interferometers such as Mach-Zehnder interferometers, ring resonators or other interferometers. A signal generator 3500 provides a common electrical signal to a common connector 3300 and a pulse width modulated (PWM) drive signal to a drive connector 3400 associated with the photonic element pair 3120. The PWM drive signal includes positive drive level pulses and negative drive level pulses. A first diode 3124 controls the first waveguide 3122. The first diode 3124 is connected such that it has a first polarity (p-n) between the drive connector 3400 and the common connector 3300. A second diode 3134 controls the second waveguide 3132. The second diode 3134 is connected such that it has a second polarity (n-p), opposite to the first polarity, between the drive connector 3400 (also known as an electrical drive pad connection) and the common connector 3300 (also known as an electrical common pad connection).

In the embodiment depicted in FIG. 5, an optics chip portion includes a first waveguide 3222 associated with a first photonic element 3220 of the pair of photonic elements 3210. As depicted in FIG. 5, a second waveguide 3232 is associated with a second photonic element 3230 of the pair of photonic elements 3210. A signal generator 3500 provides a common electrical signal to a common connector 3300 and a time-coded drive signal (e.g. PWM signal) to a drive connector 3400 associated with the photonic element pair 3210. The PWM drive signal provides positive drive level pulses and negative drive level pulses. A first diode 3224 is provided for controlling the first waveguide 3222 through a first resistor 3226. The first diode 3224 is connected such that is has a first polarity (n-p) between the drive connector 3400 and the common connector 3300. A second diode 3234 is provided for controlling the second waveguide 3232 through a second resistor 3236. The second diode 3234 is connected such that is has a second polarity (p-n), opposite to the first polarity, between the drive connector 3400 and the common connector 3300. In the embodiment of FIG. 5, the first and second diodes 3224, 3234 are not thermally coupled to the first and second waveguides 3222, 3232. Instead, the first and second waveguides 3222, 3232 are thermally coupled to resistive heaters, i.e. the first and second resistors 3226, 3236, whose heat controls the properties of the light being transported through the first and second waveguides 3222, 3232.

In the examples of FIG. 4 and FIG. 5, the signal generator 3500 sets a positive-level period of the positive drive level pulses to control current flowing through the first diode 3124, 3224 (and the resistor 3226 in the embodiment of FIG. 5) for selectively activating the first waveguide 3122, 3222 independently from the second waveguide 3132, 3232 and sets a negative-level period of the negative drive level pulses to control current flowing through the second diode 3134, 3234 (and the resistor 3336 in the embodiment of FIG. 5) for selectively activating the second waveguide 3132, 3232 independently from the first waveguide 3122, 3222. In one embodiment, a resistor in series with each diode (e.g. the resistor 3226 or the resistor 3336) generates the heat to cause the thermo-optic effect. In this embodiment, the heat generated by the diode does not affect the optical waveguide. In yet another embodiment, the resistor and diode both contribute heat to exert the thermo-optic effect.

Each resistor 3226, 3336 may be placed before or after its respective diode. Hence there are four variants of this embodiment, each having a different order of elements. In a first variant, the elements of the circuit are ordered as follows: common electrical connection, diode, resistor, common electrical drive, resistor, diode and common electrical connection (as shown in FIG. 5). In a second variant, the elements of the circuit are ordered as follows: common electrical connection, resistor, diode, common electrical drive, resistor, diode, and common electrical connection. In a third variant, the order of elements are as follows: common electrical connection, diode, resistor, common electrical drive, diode, resistor and common electrical connection. In a four variant, the order is as follows: common electrical connection, resistor, diode, common electrical drive, diode, resistor, common electrical connection.

Figure 6:
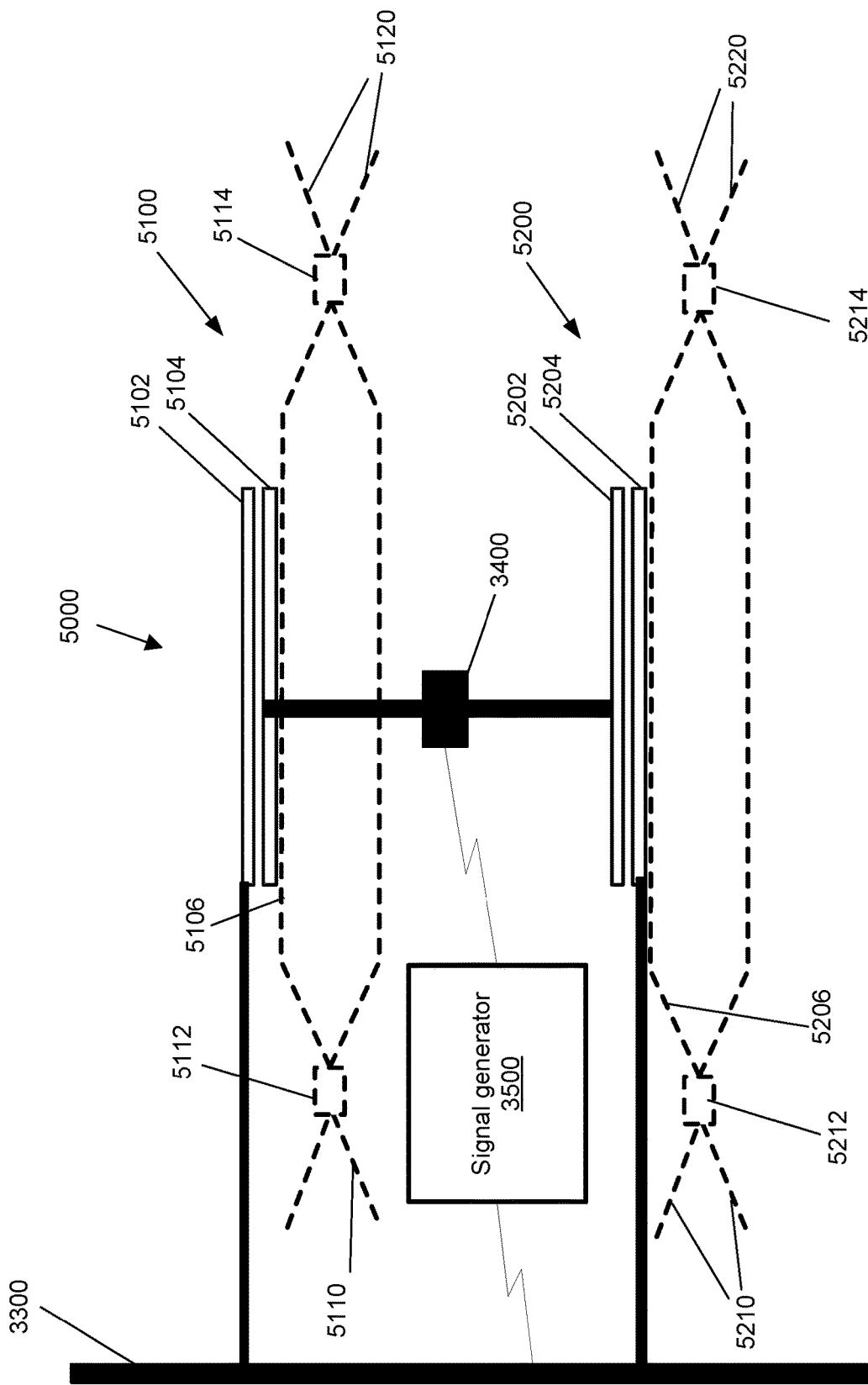
FIG. 6 depicts a pair of photonic switch cells as an example of a pair of photonic elements that are driven by a common electrical driver.

FIG. 6 depicts an opto-electronic device 5000 (e.g. a hybrid optical electronic chip) having first and second photonic switch cells 5100 and 5200 in accordance with another embodiment of the present invention. Each photonic switch cell has a diode that generates heat when electric current flows through the diode. Each diode may be silicon and may be co-located with a silicon optical waveguide. The diode and waveguide may share a thermal isolation structure such as a trench on the sides of the waveguide and an undercut beneath the waveguide.

In the embodiment depicted in FIG. 6, the first and second photonic switch cells 5100, 5200 are the first and second photonic elements. The first photonic switch cell 5100 has a first pair of optical inputs 5110, a first optical splitter 5112, a first optical combiner 5114 and a first pair of optical outputs 5120. The second photonic switch cell 5200 has a second pair of optical inputs 5210, a second optical splitter 5212, a second optical combiner 5214 and a second pair of optical outputs 5220. The first photonic switch cell 5100 includes a P-doped region 5102 and an N-doped region 5104 which together constitute a first (semiconductor) diode for heating a first waveguide 5106. The second photonic switch cell 5200 includes a P-doped region 5202 and an N-doped region 5204 which together constitute a second (semiconductor) diode for heating a second waveguide 5206. When a time-coded signal is applied by the signal generator 3500 between the drive connector 3400 and the common connector 3300, each of the photonic switch cells 5100 and 5200 can be selectively and independently heated, thereby enabling independent thermo-optic phase shifting or switching using a single shared electronic driver (e.g. drive connector 3400) and a single shared electrical connector (e.g. common connector 3300). The common connector 3300 may be a flip-chip pad. The common connector may be two common electrically conductive rails at a high common voltage and a low common voltage (which are functionally the positive and negative with respect to a reference voltage).

In the embodiment depicted in FIG. 6, the first and second diodes of the photonic switch cells 5100, 5200 have opposite polarity with respect to a reference voltage having constant amplitude but variable time. The voltage may be applied for a fraction of a time slot so that the time-averaged drive current is proportional to the magnitude of this fraction. This voltage, in some embodiments, is a pulse width modulated (PWM) voltage applied during alternating time slots for the first and second photonic switch cells 5100, 5200. A different time slot fraction is used for the first and second photonic switch cells 5100, 5200 so that the time-averaged drive currents applied to the first and second photonic switch cells 5100, 5200 are different. During the time slots allocated for the first switch cell 5100, the applied voltage is positive such that the drive current flows through the first diode 3124, 3224 to thereby heat the first photonic switch cell 5100. During the time slots allocated for the second switch cell 5200, the applied voltage is negative such that the drive current flows through the second diode 3134, 3234 to thereby heat the second photonic switch cell 5200.

From the foregoing it will be understood that the bipolar (dual polarity) PWM voltage, applied in different time slots, causes the drive current to flow selectively through either the first or second diodes. Heating of the first diode 3124, 3224 and the second diode 3134, 3234 effects a change of state (e.g. phase shift) in the first and second photonic switch cells 5100, 5200, respectively. As such, a single electrical driver can drive both photonic elements through a common electrical connection. This reduces the number of electrical connections on the chip.

In one embodiment, PWM pulse period is no more than 10% of the response time of the photonic switch cell to provide a stable optical output. To ensure an even more stable optical output, the PWM pulse period may be no more than 3% of the response time of the photonic switch cell.

In the embodiment of FIG. 6, the photonic switching is performed using the thermo-optic effect. Heat is generated by a PN diode acting as a heater. The PN diode may be made in the same silicon layer as the optical waveguide or it may be made in a secondary silicon layer on the same die. The PN diode may be inter-digitated or non-inter-digitated, the latter exposing the light in the waveguide to more of the doped region of the PN diode. In the illustrated embodiments, the photonic elements (optics portion) and the electrical elements (electronics portion) are on separate dies although in another implementation (a "monolithic" implementation) the photonic elements and the electrical elements are on the same die.

It will be appreciated that the examples depicting a single pair of a photonic elements are presented for clarity purposes. While the present invention is applicable to a hybrid optical electronic chip having only a single pair of photonic elements, it is also applicable to hybrid optical electronic chips having a plurality of photonic elements.

FIG. 7 outlines a method 7000 of electrically driving a pair of photonic elements 1020.1, 1020.2 (FIG. 2) using a common electrical driver, e.g. signal generator 3500, and a common electrical connection 3300 (FIGS. 4, 5). As depicted in FIG. 7, the method entails providing 7010 a first photonic element 1020.1 having a first diode, providing 7020 a second photonic element having a second diode, providing 7030 a common electrical connection to the first and second diodes such that the common electrical connection is connected to the first and second diodes with opposite polarity and generating 7040, using a common electrical driver (e.g. the signal generator 3500), a common electrical drive signal which is divided in time into first and second drive signal components, e.g. pulse width modulated (PWM) signals of opposite polarity occupying respective timeslots, for independently driving the first and second photonic elements through the common electrical connection. Driving the first and second photonic elements may involve causing phase shifts in first and second photonic switch cells by, for example, generating heat using the first and second diodes to cause the phase shifts in waveguides of the first and second photonic switch cells.

In alternate embodiments, the method may be applied to drive carrier-injection optical phase shifters or carrier-injection variable optical attenuators. In these alternate embodiments, the diode causes a change in the carrier density in the interior of the diode, depending on whether the diode is forward-biased or reverse-biased. The carrier density changes the optical refractive index giving rise to the optical phase shift in the photonic element. Alternatively, the carrier density changes the optical absorption or optical gain in the photonic element, causing respectively a decrease or increase in transmission of the photonic element. Although the diode generates heat, the phase shift is primarily due to the change in carrier density as opposed to the thermo-optic effect. It is to be noted that, because the intrinsic device response time is on the order of a few nanoseconds, the PWM period should be on the order of hundreds of picoseconds, which is challenging albeit possible to achieve. For example, the above may be applied to electro-absorption modulators and to semiconductor optical amplifiers.

The chip and method described above significantly reduce (approximately by half) the number of wire bonds needed for the drivers, thereby facilitating the fabrication of more complex circuits on a chip of a given size. As a corollary, the electrical connection pads occupy less space on the photonic die. If flip-chip bonds are used, a less expensive and lower yield bonding technique may be used because there are fewer bonds. The chip has particular usefulness in optical add/drop wavelength division multiplexing (WDM) equipment, WDM passive optical network (PON) devices and reconfigurable data center networks.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. A method of electrically driving photonic elements, the method comprising:
providing a first photonic element with which a first diode is associated;
providing a second photonic element with which a second diode is associated;
providing a common electrical connection to the first and second diodes such that the common electrical connection is connected to the first and second diodes with opposite polarity;
generating, using a common electrical driver, a common electrical drive signal divided in time into first and second drive signal components for independently driving the first and second photonic elements through the common electrical connection.

2. The method of claim 1 wherein generating the first and second components of the drive signal comprises generating pulse width modulated (PWM) signals of opposite polarity.

3. The method of claim 2 wherein generating the first and second components of the drive signal comprises generating positive and negative drive-level pulses in respective timeslots.

4. The method of claim 1 wherein driving the first and second photonic elements comprises causing phase shifts in first and second photonic switch cells.

5. The method of claim 4 further comprising generating heat using the first and second diodes to cause the phase shifts in waveguides of the first and second photonic switch cells.

6. The method of claim 1 further comprising generating a density of electrical carriers to effect a change in optical properties in waveguides of the first and second photonic elements.

7. The method of claim 1 comprising disposing the common electrical driver on an electrical chip separate from a photonic chip.

8. A method of electrically driving photonic elements, the method comprising:
generating, using a common electrical driver, a common electrical drive signal to a first diode associated with a first interferometer and a second diode associated with a second interferometer;
the common electrical driver connected via a common electrical connection to a positive terminal of the first diode and a negative terminal of the second diode;
the common electrical drive signal being a time divided drive signal divided into a first drive signal component and a second drive signal component, the first and second drive signal components for driving the first and second interferometers respectively, the first diode for receiving the generated common electrical drive signal and configured to selectively activate the first interferometer by the first drive signal component, but not by the second drive signal component, and the second diode for receiving the generated common electrical drive signal and for selectively activating second interferometer by the second drive signal component, but not by the first drive signal component.

9. The method of claim 8 wherein the first and second drive signal components are pulse width modulated (PWM) signals of opposite polarity.

10. The method of claim 9 wherein the first and second drive signal components are positive and negative drive-level pulses in respective timeslots.

11. The method of claim 8 wherein the first and second interferometers are first and second photonic switch cells.

12. The method of claim 1 wherein the first and the second diodes are forward-biased diodes.

13. The method of claim 12 wherein the first and the second diodes are forward-biased diodes.

14. The method of claim 12 wherein the first and second diodes are configured to generate heat by means of injected electrical carriers in each respective diode when each respective diode is in forward bias to effect a phase shift in waveguides of the first and second interferometers.

15. The method of claim 12 wherein the first and second diodes are configured to generate a density of injected electrical carriers in each respective diode when each respective diode is in forward bias to effect a change in optical properties in waveguides of the first and second interferometers.

16. The method of claim 8 wherein the common electrical driver is disposed on an electrical chip separate from an optics chip.

17. The method of claim 8 wherein generating, using the common electrical driver, the common electrical drive signal comprises generating pulse width modulated (PWM) signals of opposite polarity.

18. The method of claim 8 wherein generating, using the common electrical driver, the common electrical drive signal comprises generating positive and negative drive-level pulses in respective timeslots.

19. The method of claim 8 wherein generating, using the common electrical driver, a common electrical drive signal comprises causing phase shifts in first and second photonic switch cells.

20. The method of claim 8 further comprising generating a density of electrical carriers to effect a change in optical properties in waveguides of the first and second interferometers.

* * * * *